US008102785B2

(12) United States Patent
Rao et al.

(10) Patent No.: US 8,102,785 B2
(45) Date of Patent: Jan. 24, 2012

(54) CALIBRATING RADIOFREQUENCY PATHS OF A PHASED-ARRAY ANTENNA

(75) Inventors: Sudarshan A. Rao, Highland Park, NJ (US); Kam Hung Wu, Randolph, NJ (US); Yifei Yuan, Livingston, NJ (US)

(73) Assignee: Alcatel Lucent, Paris (FR)

( * ) Notice: Subject to any disclaimer, the term of this patent is extended or adjusted under 35 U.S.C. 154(b) by 852 days.

(21) Appl. No.: 12/124,493

(22) Filed: May 21, 2008

(65) Prior Publication Data

US 2009/0290517 A1 Nov. 26, 2009

(51) Int. Cl.
*H04J 3/00* (2006.01)

(52) U.S. Cl. ......................... 370/280; 370/278; 370/282

(58) Field of Classification Search .................. 455/101, 455/132, 272, 273, 277.1, 277.2, 278.1, 561; 370/252, 275–282; 342/21
See application file for complete search history.

(56) References Cited

U.S. PATENT DOCUMENTS

| | | | | |
|---|---|---|---|---|
| 6,591,111 | B1 * | 7/2003 | Stosz et al. | 455/518 |
| 7,248,841 | B2 * | 7/2007 | Agee et al. | 455/101 |
| 2003/0227408 | A1 | 12/2003 | Sanada et al. | 342/174 |
| 2007/0054699 | A1 * | 3/2007 | Ding et al. | 455/561 |
| 2008/0012748 | A1 * | 1/2008 | Ahn | 342/21 |

FOREIGN PATENT DOCUMENTS

| | | |
|---|---|---|
| EP | 1 077 504 | 11/1999 |
| EP | 1 120 858 A2 | 12/2000 |
| EP | 1 120 858 A3 | 12/2000 |
| WO | WO 02/078209 | 10/2002 |

OTHER PUBLICATIONS

International PCT Search Report PCT/US2009/002805 dated Sep. 2, 2009.
Written Opinion based on PCT Search Report PCT/US2009/002805 dated Sep. 2, 2009.

* cited by examiner

*Primary Examiner* — Chuong T Ho
(74) *Attorney, Agent, or Firm* — Williams, Morgan & Amerson, PC

(57) ABSTRACT

The present invention provides a method of calibrating base station comprising a plurality of antennas and operating in an Orthogonal Frequency Division Multiplex (OFDM) and Time Division Duplex (TDD) mode. One embodiment of the method includes a method of calibrating a base station comprising a plurality of antennas for beamsteering forward link traffic data to a target mobile in a TDD wireless communication system. Each antenna is connected to a corresponding radio via a transmit/receive switch that is configured to switch between a receive path and a transmit path. The method includes transmitting a first signal from a first radio via a first cross-over cable coupled to the first radio and a second radio such that the first signal is received by the second radio. The method also includes transmitting a second signal from the second radio via a second cross-over cable coupled between the first and second radios such that the second signal is received by the first radio. The method further includes determining, based on at least one of the first or second signals, a relative weight that can be applied to traffic signals transmitted from the second radio.

17 Claims, 3 Drawing Sheets

CALIBRATING RADIOFREQUENCY PATHS OF A PHASED-ARRAY ANTENNA

BACKGROUND OF THE INVENTION

1. Field of the Invention

This invention relates generally to communication systems, and, more particularly, to wireless communication systems.

2. Description of the Related Art

Wireless communication systems typically include base stations that provide wireless connectivity to cover a geographical area such as a cell or a sector of a cell. The base stations communicate with mobile units in the cell or sector over an air interface. The air interface supports downlink (or forward link) communication from the base station to the mobile unit and uplink (or reverse link) communication from the mobile unit to the base station. The uplink and downlink communication uses corresponding uplink and downlink channels, which may be realized by use of carrier frequency, modulation, coding, frequency/time multiplexing, multiple antenna techniques, or combination thereof. Examples of standards and protocols that are used to define uplink and/or downlink channels include Time Division Multiple Access (TDMA), Frequency Division Multiple Access (FDMA), Multiple Input Multiple Output (MIMO), Code Division Multiple Access (CDMA), Orthogonal Frequency Division Multiple Access (OFDMA), Spatial Division Multiple Access (SDMA), Single Carrier Frequency Division Multiple Access (SC-FDMA), and the like.

An antenna array can be used to steer a beam toward a target mobile in the forward link and to control the coverage area of a sector served by a base station. For example, a phased-array system comprised of closely spaced antennas can be used to control the beamwidth of the antenna array (e.g., beamforming) and to control the pointing direction of the antenna main lobe (e.g., beamsteering). A base station can use an antenna array to steer a beam for forward link traffic signals to a target mobile in the sector, thereby reducing transmission power and hence overall co-channel interference level in its sector and adjacent sectors. While beamsteering is used to direct individual narrow beams containing traffic information to different mobiles, common broadcast channels from the base station are received by all mobiles in the sector simultaneously and must have a beamwidth broader than individual traffic beams to cover the whole sector coverage. The beam for the common broadcast channels is fixed and is pointed toward the central line of the sector.

The beamwidth of common broadcast channels transmitted by an antenna array is usually narrower than the beamwidth of any single one of the antennas in the array. For example, in an antenna array with half-wavelength antenna spacing, the beamwidth of a vertical polarization antenna is about 110° while the beamwidth of a cross polarization antenna is about 90°. However, the desired sector beamwidth is typically about 65° for a three-sector base station configured with a cloverleaf cell layout. Although a single antenna with a 65° beamwidth is commercially available, per antenna beamwidth this small is difficult to achieve in a closely spaced antenna array. To achieve the desired sector beamwidth for the common broadcast channels using a closely spaced antenna array, it is necessary to use two or more antennas to narrow the common broadcast channels by beamforming. This also helps to share the transmit power of the common channels among power amplifiers. In summary, there are two types of beamforming for transmission from a base station to a mobile: (1) an individual narrow beam that contains traffic and mobile specific information steered towards a target mobile, (2) a broader sector-wide fixed beam that contains common broadcast channels pointed towards the central line of the sector to cover all mobiles under the sector coverage.

In order to form a beam using closely spaced multiple antennas, calibration is required to equalize the amplitudes and phases among all antenna branches in the path between the radio and antenna. Angle of departure from the antenna array is determined by the phase difference between digital signals coming out of the radios. Calibration is usually performed digitally in the radios by using calibration signals to measure the amplitude and phase differences in the appropriate paths. The calibration coefficients or weights are then applied to the receive or transmit signals to compensate for the path differences. In the more common Frequency Division Duplex (FDD) system, the carrier frequencies in the forward and reverse links are different. Hence separate calibrations must be performed in forward link and reverse link at different frequencies. However, in a Time Division Duplex (TDD) system, the forward link and reverse link share the same carrier frequency by occupying different time slots. Ideally, by reciprocity, the forward link gain at the antenna and reverse link gain at the radio receiver are reciprocal of each other. If the amplitude and phase of the signal received from a mobile in the reverse link are estimated by the radio, then the amplitude and phase are equal to the reciprocal of the received signal.

In a practical implementation, the phase response of an amplifier can vary from unit to unit and the variation may also be frequency dependent. Since separate amplifiers are used for the receive (low noise amplifier) and transmit (power amplifier) paths, reciprocity does not hold for all the branches. Therefore, it is necessary to calibrate the transmit/receive amplifier loops among all the branches. This calibration enables proper beamsteering for the traffic signals for mobiles. Reciprocity still holds from beyond the amplifiers to the antennas, which consists mainly of the RF cables between the ground equipment to the antennas at the top of the tower. Hence calibration for this RF cable portion is not required for the traffic signals in a TDD system. However, calibration of the RF cable portion is required if fixed beamforming is required for transmitting common broadcast channels. Angle of departure is usually at boresight or 0°.

One calibration technique that has been proposed for an OFDM TDD system uses one mobile unit antenna to measure the phase and amplitude or complex gain of the signal transmitted from each of the antennas in the antenna array at the base station. For example, the mobile unit can measure the complex gain of a forward link pilot channel transmitted by the base station over the air. The forward link pilot channel may use different sub-carriers to identify the branch that transmits the pilot so that the signals from the antennas can be separated by the mobile unit. The mobile unit feeds back the complex gains of all branches to the base station. In the meantime, the base station measures the received complex gains through all the base station antennas for reverse link signals. A set of complex calibration coefficients is computed by taking the ratio of the forward link gain to the reverse link gain. This set of calibration coefficients is independent of mobile location in the sector due to reciprocity of TDD because the over-the-air portions of channel propagation for the forward and reverse links are the same and (theoretically) they cancel out in computing the ratio. The final forward link beamsteering weights for each mobile unit are computed by multiplying the calibration coefficients with the corresponding reverse link complex gain for the target mobile. Since the calibration coefficients are not dependent on the mobile location, the coefficients derived from one mobile unit can be applied to other mobile units at different locations in the same sector.

This mobile-assisted calibration method has three primary drawbacks. First, although gain values from only one mobile unit in good RF condition are required, all mobile units must be equipped with the feedback feature so that they are capable of sending back the gain information to the base station. Information received from more than one mobile unit is redundant. Second, this calibration method does not calibrate the RF cables to allow the base station to transmit fixed beamwidth common broadcast channels in boresight; the beamwidth is usually 65° in a three-sector system. Third, phase and amplitude among amplifiers may not track each other over a wide bandwidth, e.g. 20 MHz. Consequently, the bandwidth needs to be divided into small sub-bands and each sub-band has to be calibrated over a smaller bandwidth.

One alternative calibration method relies on the coupling between closely spaced antennas. In this method, a calibration signal is transmitted from one antenna while the other antennas in the array receive coupled signals corresponding to the transmitted calibration signal. The coupled signals are received and processed by the corresponding radio receivers. The calibration coefficients are derived from the phase and amplitude of each coupled signal minus the corresponding coupling factor at the antennas. The calibration path therefore includes all the cables and RF components, but does not include the antenna coupling. This method has two drawbacks. First, the coupling factor between a pair of antennas must be known within a certain range of tolerance. Unfortunately, the coupling factors are not usually reliably known. For example, the coupling value may vary widely from unit to unit due to high sensitivity to near field conditions and manufacturing precision, particularly at higher carrier frequencies. Furthermore, the coupling value can be changed by degradation over time and weather conditions, and/or other effects. Variations in the coupling value may compromise the accuracy of calibration. Matching of coupling among antenna array units is necessary in the manufacturing process. Second, one of the antennas must be in transmit mode while the other antennas are in receive mode. Consequently, beamsteering will be interrupted during the calibration process.

SUMMARY OF THE INVENTION

The disclosed subject matter is directed to addressing the effects of one or more of the problems set forth above. The following presents a simplified summary of the disclosed subject matter in order to provide a basic understanding of some aspects of the disclosed subject matter. This summary is not an exhaustive overview of the disclosed subject matter. It is not intended to identify key or critical elements of the disclosed subject matter or to delineate the scope of the disclosed subject matter. Its sole purpose is to present some concepts in a simplified form as a prelude to the more detailed description that is discussed later.

In one embodiment, a method is provided for calibrating base station including a plurality of antennas and operating in an OFDM TDD mode. One embodiment of the method includes a method of calibrating a base station comprising a plurality of antennas for beamsteering forward link traffic data to a target mobile in a TDD wireless communication system. Each antenna is connected to a corresponding radio via a transmit/receive switch that is configured to switch between a receive path and a transmit path. The method includes transmitting a first signal from a first radio via a first cross-over cable coupled to the first radio and a second radio such that the first signal is received by the second radio. The method also includes transmitting a second signal from the second radio via a second cross-over cable coupled between the first and second radios such that the second signal is received by the first radio. The method further includes determining, based on at least one of the first or second signals, a relative weight that can be applied to traffic signals transmitted from the second radio.

BRIEF DESCRIPTION OF THE DRAWINGS

The disclosed subject matter may be understood by reference to the following description taken in conjunction with the accompanying drawings, in which like reference numerals identify like elements, and in which.

Figure 1:
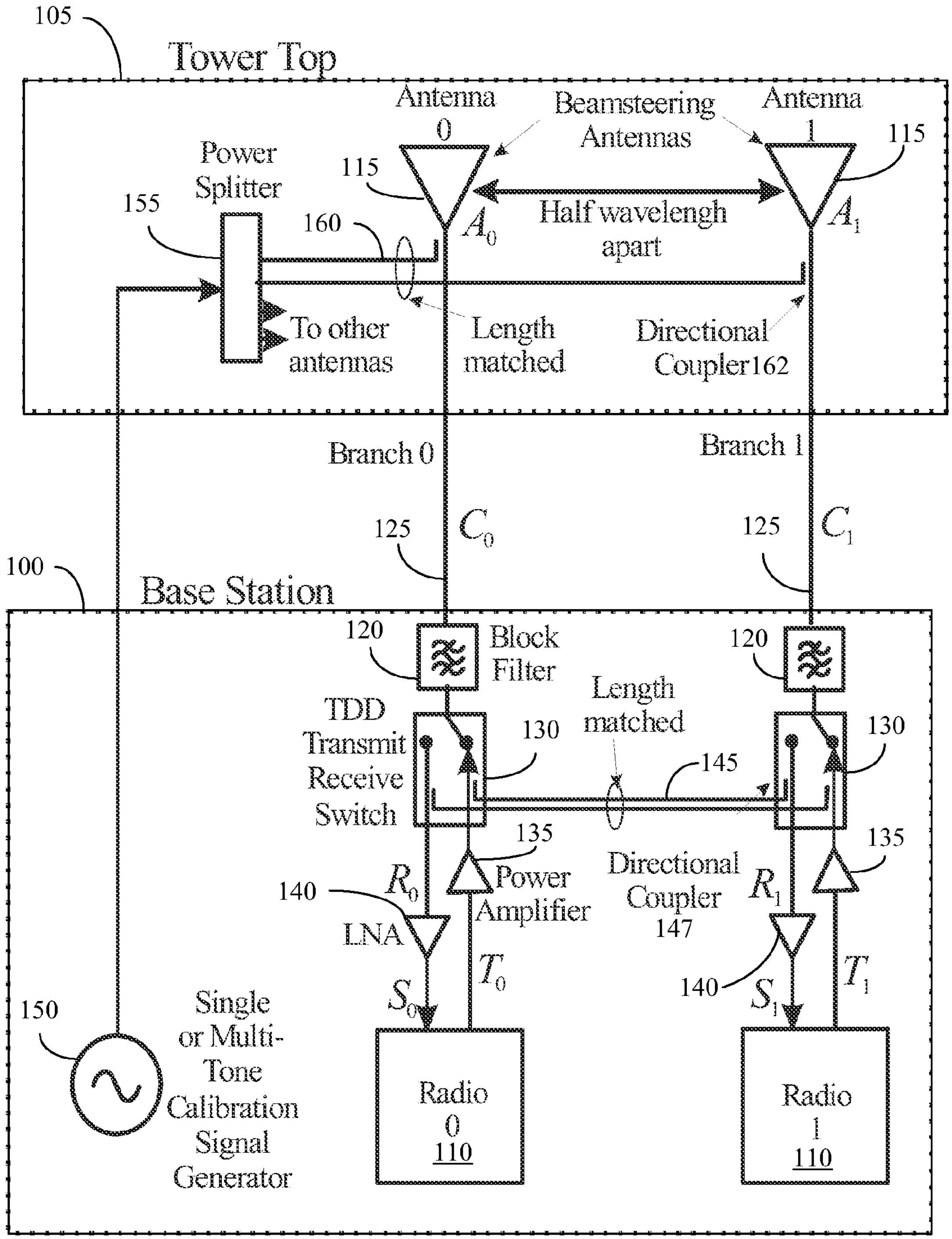
FIG. 1 conceptually illustrates a first exemplary embodiment of a base station that supports wireless communication using an antenna array with two antennas.

While the disclosed subject matter is susceptible to various modifications and alternative forms, specific embodiments thereof have been shown by way of example in the drawings and are herein described in detail. It should be understood, however, that the description herein of specific embodiments is not intended to limit the disclosed subject matter to the particular forms disclosed, but on the contrary, the intention is to cover all modifications, equivalents, and alternatives falling within the scope of the appended claims.

DETAILED DESCRIPTION OF SPECIFIC EMBODIMENTS

Illustrative embodiments are described below. In the interest of clarity, not all features of an actual implementation are described in this specification. It will of course be appreciated that in the development of any such actual embodiment, numerous implementation-specific decisions should be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The disclosed subject matter will now be described with reference to the attached figures. Various structures, systems and devices are schematically depicted in the drawings for purposes of explanation only and so as to not obscure the present invention with details that are well known to those skilled in the art. Nevertheless, the attached drawings are included to describe and explain illustrative examples of the disclosed subject matter. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

FIG. 1 conceptually illustrates a first exemplary embodiment of a base station 100 that supports wireless communication using an antenna array deployed at a tower top 105. In the illustrated embodiment, the base station 100 includes radios 110 (Radio 0 and Radio 1) that are used to generate signals for transmission over the air interface and to receive signals transmitted by its serving mobiles over the air interface. The antennas 115 in the antenna array are separated by a half wavelength of a characteristic carrier wavelength. However, persons of ordinary skill in the art having benefit of the present disclosure should appreciate that alternative embodiments may include additional antenna array branches, as will be discussed herein.

Each antenna 115 is connected to a block filter 120 in the base station 100 by an RF cable 125. The block filter 120 is connected to a transmit/receive switch 130. When the transmit/receive switch 130 is in the transmit mode, the path from the radio 110 to the antenna 115 includes a transmit portion made up of a power amplifier 135 and the relevant cabling. When the transmit/receive switch 130 is in the receive mode, the path from the antenna 115 to the radio 110 includes a receive portion made up of a low noise amplifier (LNA) 140 and the relevant cabling. A pair of cross-over length-matched cables 145 is used to couple a small portion of the transmit signal power from the transmit path to the receive path of the other branch via directional couplers 147 on both ends. The addition of the cross-over cable 145 creates a calibration loop encompassing the radio transmitter, power amplifier, cross-over cable, low noise amplifier and radio receiver. As used herein, the phrase "length-matched cable" refers to cables of the same design and material cut to approximately the same length in order to keep the signal phases matched to within few degrees. For example, the cross-over length-matched cables 145 can be matched to within few millimeters in the PCS band.

The base station 100 also includes a signal generator 150 that is used as a source of calibration signals over the entire bandwidth of operation. The signal generator 150 can be used to generate a single tone that corresponds to a particular subcarrier or multiple tones distributed within the range of carrier frequencies. The externally generated calibration tones can overlap with reverse link OFDM data from mobile units but at a much higher power, e.g. >20 dB stronger. The overlapped mobile sub-carriers may be corrupted, but only over one or two symbol duration. It is expected that calibration is executed only a few times every day. The signal generator 150 is connected to a power splitter 155 that can distribute the generated signals to the antennas 115 via length-matched cables 160.

Amplitude and phase calibration of the system may be performed for a transceiver portion and a cable portion separately. The transceiver portion includes transmit and receive subsystems of the radios 110 as well as the power amplifier 135 for transmission and the low noise amplifier (LNA) 140 for reception. The cable portion may include the path leading from the top of the RF cables 125 to the radio receiver 110. In the illustrated embodiment, the transceiver portion is designed for time division duplex (TDD) beamsteering to individual mobile units and the cable portion is designed for transmission of common broadcast channels to all mobile units in the sector or cell served by the antenna array.

The gains of the branches of the transceiver portion and/or the cable portion of the calibration loop can be determined and used to calibrate the different transmission paths. In the illustrated embodiment, the combined gains of the power amplifiers 135 and their short cables connecting to the radios 110 and switches 130 are designated as $T_o$ and $T_1$ for Radio 0 and Radio 1, respectively. Similarly, the gains of the LNAs 140 and their short cables connecting to the radios 110 and switches 130 are designated as $R_0$ and $R_1$, respectively. The reverse link signals from a mobile unit received at Antenna 0 and Antenna 1 are designated as $A_0$ and $A_1$, respectively. The signals $A_0$ and $A_1$ encompass the signal amplitude, angle of arrival and antenna gain. The gains of the RF cable 125 leading from TDD switch 130 to the antennas 115 at the top of the tower 105 are designated as $C_0$ and $C_1$. All variables are complex values. The received signals at Radio 0 and Radio 1 are $$S_0=A_0C_0R_0 \tag{1}$$

and $$S_1=A_1C_1R_1 \tag{2}$$

To transmit the forward link signal to a mobile unit, the baseband signal at the radio in Branch 1 would be weighted by $$W_1 = \frac{A_0C_0R_0}{A_1C_1R_1} \tag{3}$$

if the two power amplifiers 135 were identical. However, the frequency responses of the power amplifiers 135 typically differ, which may require applying different weights to the baseband signals generated by the radios 110.

To account for the difference between the two power amplifiers 110 and their connecting cables, a difference in the power amplifier gains can be determined. The gains in the transmit paths in Branch 0 and Branch 1 are $$G_{T0}=T_0C_0 \tag{4}$$

and $$G_{T1}=T_1C_1 \tag{5}$$

Assuming the amplitude of the transmit signal in Branch 0 is unity, i.e.

$$B_0=1 \tag{6}$$

then the transmit signal of Branch 1 is $$B_1 = \frac{T_1C_1}{T_0C_0}W_1 = \frac{A_0T_1R_0}{A_1T_0R_1} \tag{7}$$

This is the weight that can be applied to the baseband transmit signal in Radio 1 after factoring in the power amplifier difference.

The ratio $$\left(\frac{T_1R_0}{T_0R_1}\right)$$

can be measured by amplifier calibration using a transceiver calibration loop to calibrate the transceiver portion of each branch. As discussed above, transceiver calibration loop includes the circuits in the transmit and receive subsystems in the radio 110, as well as the power amplifier 135 and LNA 140 on each branch, including the short cables connecting to the input and output of each amplifier. Two length-matched cables 145 are connected between the two branches, as shown in FIG. 1. Each cable 145 is connected to the output of a power amplifier 135 and the input of the LNA 140 of the other branch. Each end of the length-matched cable 145 is connected through a directional coupler 147. The directional couplers are located before the TDD transmit/receive switches 130. The output signal of one radio 110 is coupled and received by the receiver of the other branch. For example, each radio 110 may generate a pilot signal that is transmitted on a pilot channel. A small portion of the pilot signal, along with all other transmitted signals, may be directed from the transmit path of one radio 110 into the receive path of another radio 110.

In this illustration, some of the signal transmitted from Radio 0 is coupled and routed to the receiver in Radio 1. The composite gain can be measured by a pilot signal or a calibration signal as $T_0 R_1$. Similarly, the composite gain for the other pair is $T_1 R_0$. The ratio of these gains is $$G_1 = \left(\frac{T_1 R_0}{T_0 R_1}\right) \tag{8}$$

Substituting the gain ratio in (7), $$B_1 = \frac{A_0}{A_1} G_1 \tag{9}$$

This is the complex factor that is applied to the transmit signal at Radio 1, while the factor for the transmit signal at Radio 0 is unity. In general, an amplifier has linear phase in the frequency response. The difference in group delay over the bandwidth of amplifiers of the same design and components is usually small enough not to impact beamsteering. In which case, a single calibration at the center of the band is sufficient to align the phase responses of all the beamsteering amplifiers within the bandwidth. Another source of possible mismatch comes from the analog filters in the transceiver. Amplitude and phase ripples within the bandwidth are usually small enough not to impact beamsteering. However, if the ripples are large enough to impact the required beamsteering precision, subband calibrations using a multi-tone calibration source may be used.

Cable calibration may be implemented if the common broadcast channels are to be beamformed to a nominal beamwidth, e.g. 65°. The cable here refers to the RF cable 125 leading from the TDD switch 130 to the antenna 115 port at the top of tower 105, including the block filter 120. In one embodiment, a single-tone signal is generated by the signal generator 150 at the base station 100 and transmitted via a small RF cable to the top of the tower 105. The signal is spilt using the power splitter 155 at the top of the tower and distributed to the antennas 115 via a directional coupler. The distribution cables 160 in each antenna array are length matched and built in each antenna array with directional couplers 162. When in receive mode, the calibration signal is received by all the receivers simultaneously. The composite gains of Branch 0 and Branch 1 are $C_0 R_0$ and $C_1 R_1$, respectively. The gain of Branch 1 relative to the gain in Branch 0 is $$H_1 = \frac{C_1 R_1}{C_0 R_0} \tag{10}$$

To transmit a beam at boresight, the phase and amplitude of the signal should be approximately equal. Assuming the transmit signal at Antenna 0 is unity, i.e.

$$E_0 = 1 \tag{11}$$

and the transmit signal at Antenna 1 is $$E_1 = \frac{C_0 T_0}{C_1 T_1} \tag{12}$$

Substituting $G_1$ in (8) and $H_1$ in (10) into (12), $$E_1 = \frac{1}{G_1 H_1} \tag{13}$$

This is the complex factor that is applied to the transmit signal at Radio 1, while the factor for the transmit signal at Radio 0 is unity. A block filter has ripples in phase and amplitude. The ripples are usually small enough not to impact beamsteering. However, if the ripples are too large to impact beamsteering, sub-band calibrations using a multi-tone calibration source may be used, as described in the transceiver calibration.

The above calibration method can be extended to an antenna array with more than two antennas. Two configurations are possible: daisy chain and parallel. These configurations are variants of the same method described above. The difference is in implementation. The daisy chain configuration has a slight disadvantage of potentially permitting error propagation to other branches when there is a calibration error in one of the branches in the middle.

Figure 2:
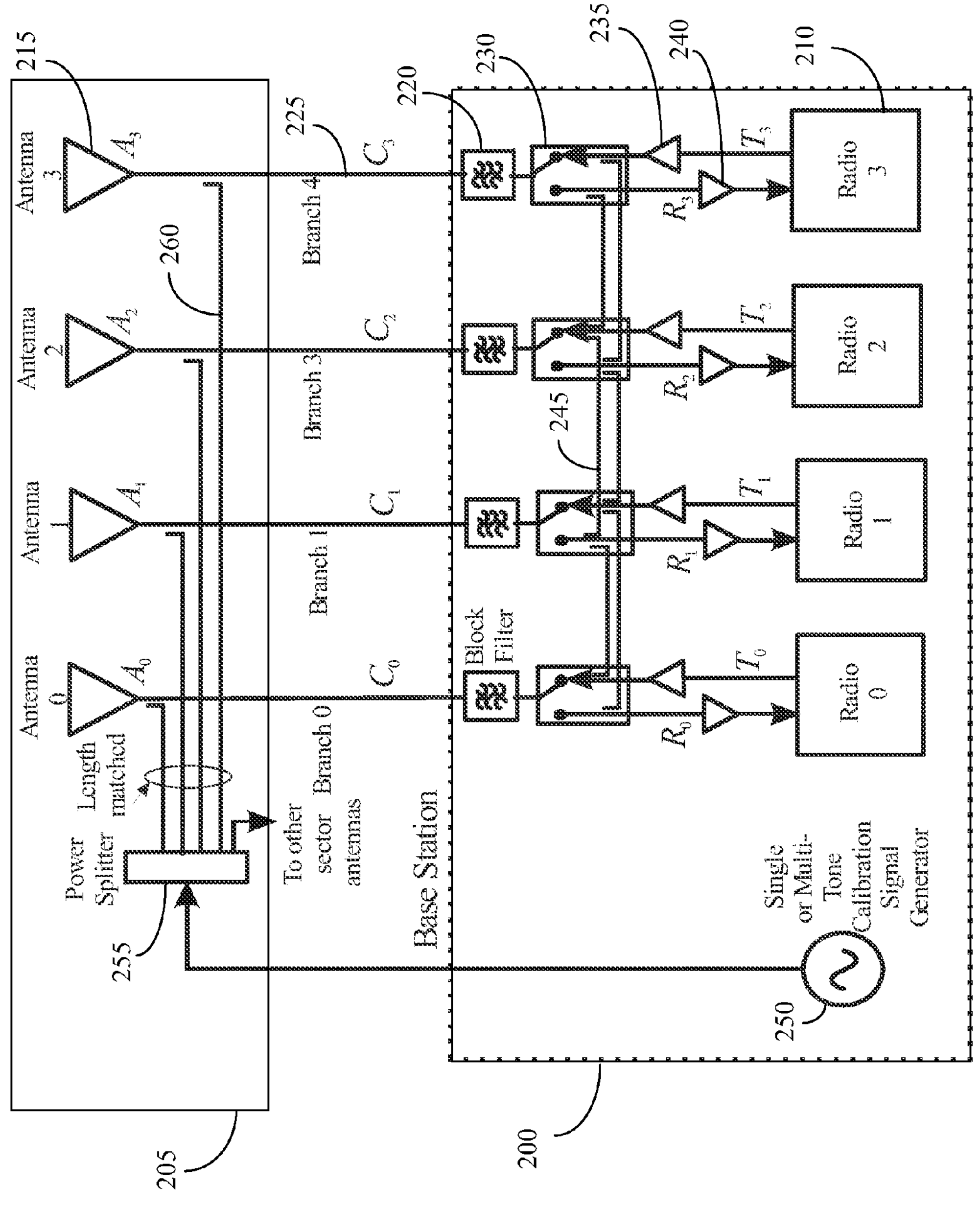
FIG. 2 conceptually illustrates a second exemplary embodiment of a base station that supports wireless communication using an antenna array with four antennas in a daisy-chained calibration configuration.

FIG. 2 conceptually illustrates a second exemplary embodiment of a base station 200 that supports wireless communication using a daisy-chained calibration configuration. The second exemplary embodiment of the base station 200 and the tower top 205 differs from the first exemplary embodiment by including a larger antenna array. In the illustrated embodiment, the base station 200 includes radios 210 (Radios 0-3) that are used to generate signals for transmission over the air interface and to receive signals transmitted over the air interface. The radios 210 are part of four branches (or signal paths) within the base station 200 and the tower top 205. At one end of each branch is a radio 210 and at the other end of each branch is an antenna 215 that forms a part of the antenna array at the tower top 205. The antennas 215 in the antenna array are separated by a half wavelength of a characteristic carrier wavelength. Each antenna 215 is connected to a block filter 220 by an RF cable 225. The block filter 220 is connected to a transmit/receive switch 230. A transmit portion of each branch is made up of a power amplifier 235 and its associated cabling, while a receive portion of each branch is made up of a low noise amplifier (LNA) 240 and its associated cabling.

Length-matched cables 245 are used to couple transmit paths of each branch to receive paths of neighboring branches. For example, the cross-over length-matched cables 245 can be matched to within few millimeters in the PCS band. In the daisy-chained configuration shown in FIG. 2, successive pairs of branches are coupled together. For example, the transmit path of one branch is coupled to the receive branch of the next branch; similar successive crossover connections are applied to the other branches. For RF cable calibration, a signal generator 250 is used as a source of calibration signals at or near the center of the band or at selected intervals of frequencies over the entire bandwidth of operation. The signal generator 250 can be used to generate a single tone that corresponds to a particular subcarrier or multiple tones distributed within the range of carrier frequencies. The signal generator 250 is connected to a power splitter 255 that can distribute the generated signals to the antennas 215 via length-matched cables 260.

Calibration of the transmission portion may be performed using a generalized version of the techniques described above with regard to FIG. 1. In the illustrated embodiment shown in FIG. 2, the amplifier calibration factors for the four branches are given by $$B_0' = 1 \tag{14}$$

$$B_1' = \frac{A_0}{A_1}G_1', \text{ where } G_1' = \left(\frac{T_1R_0}{T_0R_1}\right) \tag{15}$$

$$B_2' = \frac{A_1}{A_2}G_2'B_1', \text{ where } G_2' = \left(\frac{T_2R_1}{T_1R_2}\right) \tag{16}$$

$$B_3' = \frac{A_2}{A_3}G_3'B_2', \text{ where } G_3' = \left(\frac{T_3R_2}{T_2R_3}\right) \tag{17}$$

The cable calibration factors for the four branches are given by $$E_0' = 1 \tag{18}$$

$$E_1' = \frac{1}{G_1'H_1'}, \text{ where } H_1' = \frac{C_1R_1}{C_0R_0} \tag{19}$$

$$E_2' = \frac{E_1'}{G_2'H_2'}, \text{ where } H_2' = \frac{C_2R_2}{C_1R_1} \tag{20}$$

$$E_3' = \frac{E_2'}{G_3'H_3'}, \text{ where } H_3' = \frac{C_3R_3}{C_2R_2} \tag{21}$$

Figure 3:
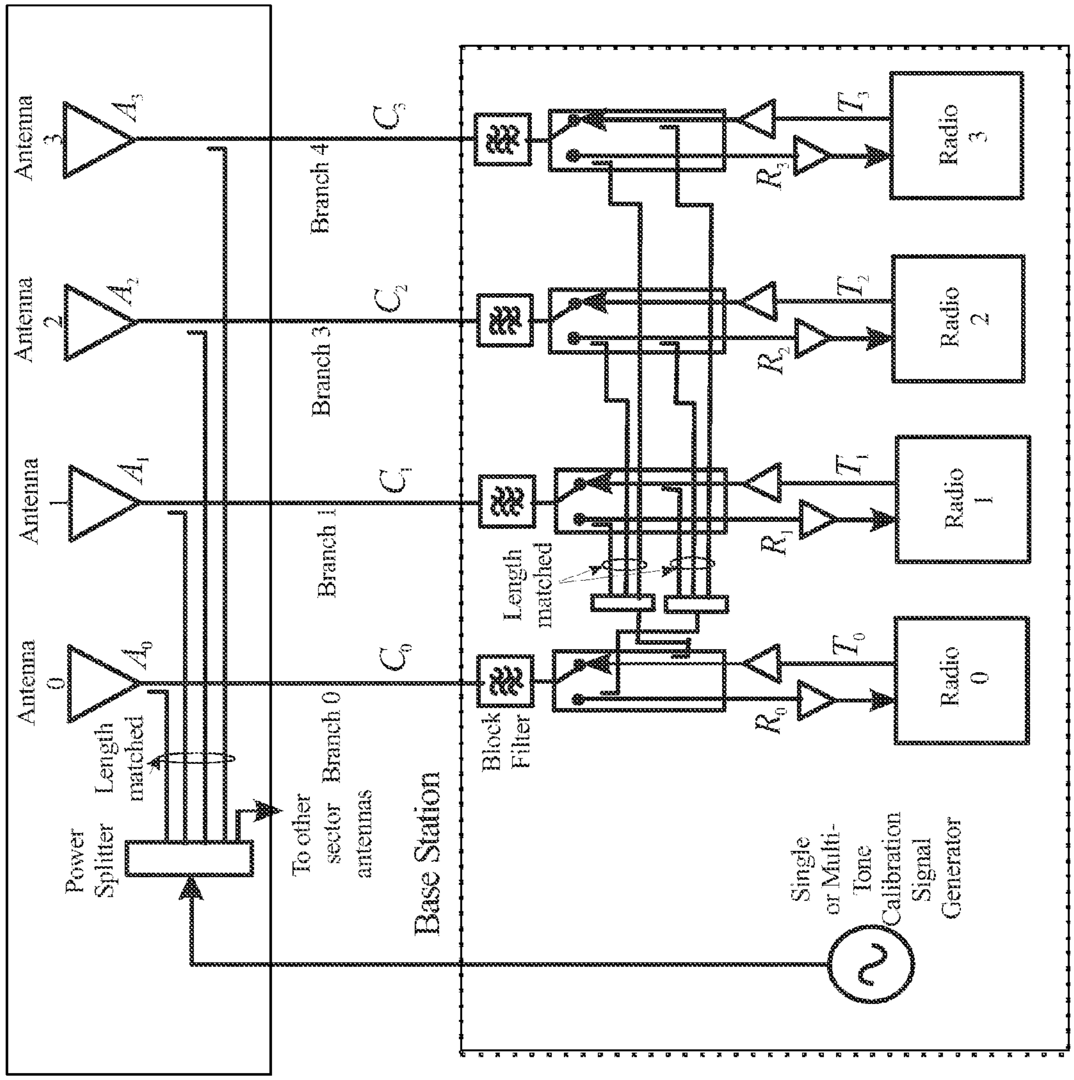
FIG. 3 conceptually illustrates a third exemplary embodiment of a base station that supports wireless communication using an antenna array with four antennas in a parallel calibration configuration.

FIG. 3 conceptually illustrates a third exemplary embodiment of a base station that supports wireless communication using an antenna array in a parallel calibration configuration. This third exemplary embodiment differs from the first exemplary embodiment and the second exemplary embodiment by designating one branch as a reference and coupling it to each of the other branches using parallel length-matched cables. In the illustrated embodiment, Branch 0 is designated as the reference branch. This parallel configuration pairs Branch 1 with Branch 0, Branch 2 with Branch 0, Branch 3 with Branch 0, etc., as shown in FIG. 3. The pairing is done by splitting the transmit and receive coupling ports into three outputs each, one to each of the corresponding coupling ports on the other branches. The amplifier calibration factors for the four branches are given by $$B_0'' = 1 \tag{22}$$

$$B_1'' = \frac{A_0}{A_1}G_1'', \text{ where } G_1'' = \left(\frac{T_1R_0}{T_0R_1}\right) \tag{23}$$

-continued $$B_2'' = \frac{A_0}{A_2}G_2'', \text{ where } G_2'' = \left(\frac{T_2R_0}{T_0R_2}\right) \tag{24}$$

$$B_3'' = \frac{A_0}{A_3}G_3'', \text{ where } G_3'' = \left(\frac{T_3R_0}{T_0R_3}\right) \tag{25}$$

The cable calibration factors for the four branches are given by $$E_0'' = 1 \tag{26}$$

$$E_1'' = \frac{1}{G_1''H_1''}, \text{ where } H_1'' = \frac{C_1R_1}{C_0R_0} \tag{27}$$

$$E_2'' = \frac{1}{G_2''H_2''}, \text{ where } H_2'' = \frac{C_2R_2}{C_0R_0} \tag{28}$$

$$E_3'' = \frac{1}{G_3''H_3''}, \text{ where } H_3'' = \frac{C_3R_3}{C_0R_0} \tag{29}$$

Embodiments of the calibration techniques described herein provide a simple, reliable and highly accurate technique for calibration of a TDD OFDM system. The techniques described herein have a number of advantages over other approaches. For example, the calibration technique described herein does not interrupt normal operation of commercial mobile units and it does not rely on loopback information from the mobile units, thereby improving reliability and reducing overhead load on the reverse link. Embodiments of the techniques described herein include an option for calibrating the RF cable on the tower to allow for beamwidth adjustment of common broadcast channels. Furthermore, the additional hardware that is added to the base station to implement the techniques described herein is minimal and low cost. Calibration of RF tower cable does not rely on coupling between adjacent antennas, thereby eliminating uncertainty on calibration accuracy and calibration on all antennas can be performed concurrently, thereby reducing the calibration time. A minimal amount of computation is used for calculating the calibration weights and the techniques can be applied to numerous wireless communication standards and/or protocols, including UMB, LTE and WiMax.

Portions of the disclosed subject matter and corresponding detailed description are presented in terms of software, or algorithms and symbolic representations of operations on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" or "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the disclosed subject matter are typically encoded on some form of program storage medium or implemented over some type of transmission medium. The program storage medium may be magnetic (e.g., a floppy disk, USB drive, or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The disclosed subject matter is not limited by these aspects of any given implementation.

The particular embodiments disclosed above are illustrative only, as the disclosed subject matter may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed:

1. A method of calibrating a base station comprising a plurality of antennas for beamsteering forward link traffic data to a target mobile in a time division duplex (TDD) wireless communication system, each antenna being connected to a corresponding radio via a transmit/receive switch that is configured to switch between a receive path and a transmit path, the method comprising:

transmitting a first signal from a first radio via a first cross-over cable coupled to the first radio and a second radio such that the first signal is received by the second radio;

transmitting a second signal from the second radio via a second cross-over cable coupled between the first and second radios such that the second signal is received by the first radio, wherein the first and second cross-over cables are length-matched cross-over cables; and determining, based on at least one of the first or second signals, a relative weight that can be applied to traffic signals transmitted from the second radio.

2. The method of claim 1, wherein transmitting the first signal comprises transmitting at least one of a pilot signal over a first pilot signal channel or a calibration signal of known content.

3. The method of claim 2, wherein transmitting the second signal comprises transmitting at least one of a pilot signal over a second pilot signal channel or a calibration signal of known content.

4. The method of claim 1, wherein transmitting the first signal over the first cross-over cable comprises transmitting the first signal over a first cross-over cable that is coupled to a transmit path associated with the first radio via a directional coupler at the output of a power amplifier of the first radio and a receive path associated with the second radio via a directional coupler at an input of a low noise amplifier of the second radio.

5. The method of claim 4, wherein transmitting the second signal over the second cross-over cable comprises transmitting the second signal over a second cross-over cable connecting a transmission path associated with the second radio via a directional coupler at the output of a power amplifier of the second radio and a receive path associated with the first radio via a directional coupler at an input of a low noise amplifier in the first radio.

6. The method of claim 1, wherein determining the relative weight comprises determining a first product of a gain of the transmission path associated with the first radio and a gain of the receive path associated with the second radio.

7. The method of claim 6, wherein determining the relative weight comprises determining a second product of a gain of the transmission path associated with the second radio and a gain of the receive path associated with the first radio.

8. The method of claim 7, wherein determining the relative weight comprises determining the relative weight as a function of a first ratio of the first product and the second product.

9. The method of claim 8, wherein the base station comprises an RF cable connected between each antenna and a corresponding transmit/receive switch that is connected to the receive path and transmit path of each radio, the method comprising determining a second relative weight applied to signals generated by the first and second radios for transmission using first and second antennas, respectively.

10. The method of claim 9, wherein determining the second relative weight comprises determining a third product of a gain of a first RF cable connected to the first antenna and a gain of the receive path of the first radio.

11. The method of claim 10, wherein determining the second relative weight comprises determining a fourth product of a gain of a second RF cable connected to the second antenna and a gain of the receive path of the second radio.

12. The method of claim 11, wherein determining the second relative weight comprises determining the second relative weight based on a second ratio of the third product and the fourth product.

13. The method of claim 12, wherein determining the second relative weight comprises determining the second relative weight based on a product of the first ratio and the second ratio.

14. The method of claim 13, wherein determining the second relative weight comprises determining a second relative weight applied to common broadcast signals generated by the first and second radios.

15. The method of claim 9, wherein determining the second relative weight comprises determining the second relative weight based on signals provided to the first and second antennas by a single tone generator or a multi-tone generator in the base station.

16. The method of claim 9, comprising determining a plurality of first relative weights applied to signals generated by a plurality of radios for transmission by the plurality of antennas, the plurality of radios being coupled in at least one of a daisy chain configuration or a parallel configuration.

17. The method of claim 16, comprising determining a plurality of second relative weights applied to signals generated by the plurality of radios for transmission by the plurality of antennas.

* * * * *